(12) United States Patent
Sharp

(10) Patent No.: US 10,060,157 B1
(45) Date of Patent: Aug. 28, 2018

(54) LOCK POSITION SENSING MECHANISM

(71) Applicant: Snap-on Incorporated, Kenosha, WI (US)

(72) Inventor: William T. Sharp, Pleasant Prairie, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/793,204

(22) Filed: Oct. 25, 2017

Related U.S. Application Data

(60) Provisional application No. 62/500,751, filed on May 3, 2017.

(51) Int. Cl.
*G05B 19/00* (2006.01)
*E05B 41/00* (2006.01)
*G01B 7/00* (2006.01)
*E05B 47/00* (2006.01)

(52) U.S. Cl.
CPC .......... *E05B 41/00* (2013.01); *E05B 47/0012* (2013.01); *E05B 2047/0069* (2013.01); *G01B 7/003* (2013.01)

(58) Field of Classification Search
CPC ....................................................... E05B 41/00
USPC ........................................................... 340/5.1
See application file for complete search history.

(56) References Cited

U.S. PATENT DOCUMENTS

| | | | |
|---|---|---|---|
| 3,751,088 A | 8/1973 | Schlage | |
| 3,872,696 A * | 3/1975 | Geringer | E05B 47/0002 292/254 |
| 4,129,865 A | 12/1978 | Randall | |
| 4,658,611 A | 4/1987 | Deacon | |
| 4,744,021 A | 5/1988 | Kristy | |
| 4,887,445 A | 12/1989 | Beatty | |
| 4,893,704 A | 1/1990 | Fry | |
| 5,199,288 A | 4/1993 | Merilainen | |
| 5,339,662 A | 8/1994 | Goldman | |
| 5,511,832 A | 4/1996 | Kunzel | |
| 5,925,861 A | 7/1999 | Fromberg | |
| 6,116,067 A | 9/2000 | Myers | |
| 6,441,735 B1 | 8/2002 | Marko | |
| 6,655,180 B2 | 12/2003 | Gokcebay | |
| 7,946,538 B1 * | 5/2011 | Beaman | B61L 5/10 246/220 |
| 8,720,239 B2 * | 5/2014 | Crass | B25H 3/028 70/256 |
| 8,928,457 B2 | 1/2015 | Jin | |
| 9,056,641 B2 * | 6/2015 | Visenzi | B62J 9/001 |
| 9,127,477 B1 * | 9/2015 | Yang | E05B 17/10 |

(Continued)

*Primary Examiner* — Santiago Garcia
(74) *Attorney, Agent, or Firm* — Seyfarth Shaw LLP

(57) ABSTRACT

A lock position sensing mechanism that senses the position of the lock only in the locked and unlocked states. The mechanism can include a link arm that is separate from the locking bolt that locks a locking device in which the lock position sensing mechanism is used. The mechanism can sense the locked and unlocked states with a metallic object that is placed on the link arm and with two induction sensors that are provided within the locking device. The first and second induction sensors can be located at a position corresponding to the locked and unlocked state, respectively, to determine the locked or unlocked state. The sensors can communicate with a transceiver that then communicates the position of the locking mechanism to a user device and/or to a local display.

10 Claims, 3 Drawing Sheets

(56) References Cited

U.S. PATENT DOCUMENTS

| | | | |
|---|---|---|---|
| 9,600,696 B2* | 3/2017 | Ebner | G07C 9/00571 |
| 2004/0239125 A1* | 12/2004 | Chen | E05B 5/00 |
| | | | 292/216 |
| 2008/0047726 A1* | 2/2008 | Shai | B25H 3/02 |
| | | | 174/17.08 |
| 2009/0140858 A1* | 6/2009 | Gore | G08B 13/04 |
| | | | 340/547 |
| 2011/0133039 A1* | 6/2011 | Beaman | B61L 5/10 |
| | | | 246/448 |
| 2015/0114082 A1* | 4/2015 | Blanchard | G01C 25/005 |
| | | | 73/1.77 |
| 2015/0315816 A1* | 11/2015 | Gopalakrishnan | E05B 27/0003 |
| | | | 70/344 |
| 2016/0275781 A1* | 9/2016 | Nold | G08B 25/008 |
| 2016/0340943 A1* | 11/2016 | Sharp | E05B 47/026 |
| 2016/0343185 A1* | 11/2016 | Dumas | G07C 9/00309 |
| 2017/0368897 A1* | 12/2017 | Brickley | H04L 67/12 |

* cited by examiner ly to a lock position sensing mechanism that senses the position of the lock only in the locked and unlocked states with a link arm that is separate from the locking bolt. In an embodiment, a metallic object can be placed on the link arm and two induction sensors can be provided within the enclosure that is being locked. The first induction sensor can be located where the link arm metallic object will be when the locking mechanism is in the locked position, and the second induction sensor be located where the link arm metallic object will be when the locking mechanism is in the unlocked state. The sensors can communicate with a transceiver that then communicates the state of the lock mechanism to a user device, a local display, or both.

LOCK POSITION SENSING MECHANISM

RELATED APPLICATIONS

The present application is related to, and claims priority to, provisional patent application Ser. No. 62/500,751, filed May 3, 2017, the disclosure of which is incorporated herein.

TECHNICAL FIELD OF THE INVENTION

The present invention relates to lock mechanisms. More particularly, the present invention relates to lock mechanisms with sensing capabilities to sense when the lock is in either of the locked or unlocked states.

BACKGROUND OF THE INVENTION

Locks are common security measures used in, for example, a toolbox or other enclosure. The lock can secure the enclosure and allow the enclosure to be selectively opened only when an authorized user causes the lock to transition from the locked state to the unlocked state. Several methods of unlocking exist, for example, a physical key, a fingerprint scanner, or remote means such as a user transmitting a signal with a smart phone. Common electronic methods employ an actuator that causes a lock rod to move between locked and unlocked positions to remotely or electronically control the locked state of the enclosure.

Many conventional enclosures include lock mechanisms where it is difficult to determine when the lock is in the locked or unlocked states. For example, a lock mechanism may be remotely controlled by a user device such as a smart phone, but the locked state may be determined by the relative location of the bolt that provides the locking functionality. The location of the bolt itself is constantly monitored and when it reaches a predetermined position, a signal is sent to the user device to indicate a locked or unlocked states. Conventional lock mechanisms employ a sensor on the bolt itself, rather than a separate device or feature of the lock mechanism. Conventional lock mechanisms also constantly monitor the state of the bolt, requiring significant power transmission to repeatedly send signals to and from the user device.

SUMMARY OF THE INVENTION

The present invention relates broadly to a lock position sensing mechanism that senses the position of the lock only in the locked and unlocked states with a link arm that is separate from the locking bolt. In an embodiment, a metallic object can be placed on the link arm and two induction sensors can be provided within the enclosure that is being locked. The first induction sensor can be located where the link arm metallic object will be when the locking mechanism is in the locked position, and the second induction sensor be located where the link arm metallic object will be when the locking mechanism is in the unlocked state. The sensors can communicate with a transceiver that then communicates the state of the lock mechanism to a user device, a local display, or both.

In an embodiment, the present invention broadly comprises a locking mechanism that is selectively positions between locked and unlocked states. In an embodiment, a plate can be coupled to the lock mechanism and rotatable between a first position, corresponding to the locked state, and a second position, corresponding to an unlocked state. A link arm can be coupled to at least one of the lock mechanism and the plate, and rotate with the plate between the first and second positions. A positioning tab can be located on the link arm, and a first sensor can be located in a first portion of an enclosure, and a second sensor can be spaced from the first sensor and located in a second portion of the enclosure. The enclosure can further include a communications interface adapted to transmit signals. When the positioning tab is moved proximate the first sensor, a first locked state signal is transmitted by the communications interface, and when the positioning tab is moved proximate the second sensor, a second locked state signal is transmitted by the communications interface.

In another embodiment, the present invention broadly comprises a position locater including a plate, a link arm rotatable with the plate between first and second positions, a first sensor located in a first location, a second sensor spaced from the first sensor and located in a second location, and a communications interface adapted to transmit signals. When the positioning tab is located proximate the first sensor, a first locked state signal is transmitted by the communications interface, and when the positioning tab is located proximate the second sensor, a second locked state signal is transmitted by the communications interface.

In yet another embodiment, the present invention broadly comprises a method of determining whether a positioning tab has moved from a first sensor associated with the default locking state to a second sensor, and outputting a changed locking state signal when it is determined the positioning tab moved from the first sensor to the second sensor.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
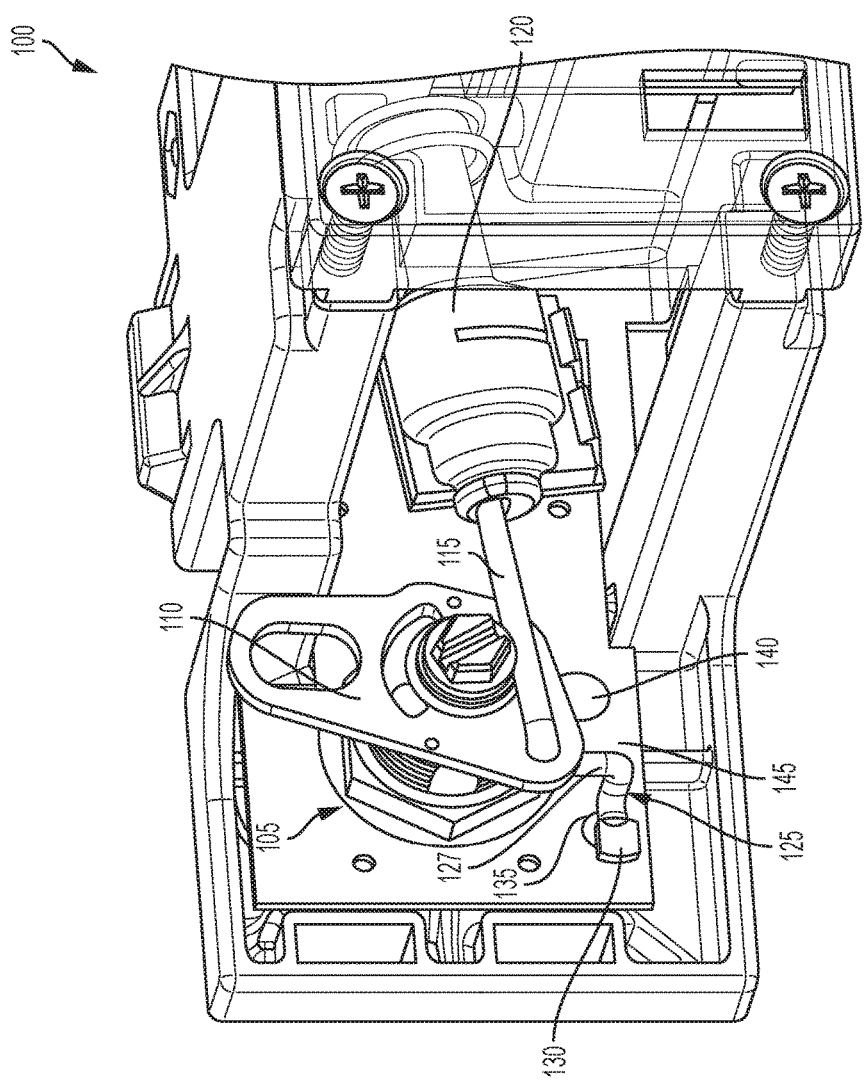
FIG. 1 is a side, partial see-through, perspective view of a locking mechanism according to at least one embodiment of the present invention.

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is intended to refer only to an exemplary embodiment, and is not intended to limit the claims beyond what is explicitly recited.

The present invention relates broadly to a lock position sensing mechanism that senses the position of the lock only in the locked and unlocked states, rather than constantly monitoring a lock mechanism or bolt position. The sensing mechanism includes a link arm that is separate from the locking bolt. For example, a metallic object can be placed on the link arm and two induction sensors can be provided within an enclosure that is being locked. The sensors can be located in areas corresponding to the locked and unlocked states of the locking mechanism. The sensors can then transmit the locked or unlocked signal to a transceiver that then communicates the position of the locking mechanism to a user device.

Referring to FIG. 1, a locking device 100 can include a locking mechanism 105 with a plate 110 that rotates between locked and unlocked positions based on linear or quasi-linear movement of an arm 115. The arm 115 can be coupled to an actuator 120 that electronically or mechanically causes the linear or quasi-linear movement of the arm 115.

A position locator 125 can be disposed within the locking device 100 to determine the locked and unlocked states of the locking mechanism. For example, the position locator 125 can include a link arm 127 that rotates with the plate 110 between the locked and unlocked positions. The link arm 127 can include a positioning tab 130 that is composed of, for example, a metallic object. The positioning tab 130 can then cause a signal to be transmitted when the positioning tab 130 reaches a first sensor 135 or a second sensor 140. For example, the first 135 and second 140 sensors can be inductive sensors, and the positioning tab 130 can be a metallic object, where the relative proximity of the positioning tab 130 to the first 135 or second 140 sensors causes a signal to be transmitted. For example, the signal can be a changed locking state signal signifying that the locking state of the locking device 100 has changed based on the relative proximity of the positioning tab 130 to the first 135 or second 140 sensor. The signal can be emitted to a communications interface 145 that then transmits the signal to a user device, discussed below in more detail, or where the communications interface 145 transmits the signal to a display located on the locking device 100.

The position locator 125 overcomes the drawbacks of the prior art with a more simplistic design that does not constantly monitor the location of the bolt that locks the locking device 100, but that monitors when the positioning tab 130 is near the first 135 or second 140 sensor. In this manner, a signal is sent to either a display on the locking device 100 or to the user device, but only when the locked state of the locking device 100 changes. By transmitting the signal fewer times and only when the state changes, the position locator 125 avoids unnecessary use of power by reducing the number of transmissions. The position locator 125 also avoids a common situation inherent in prior art locking sensors by providing the positioning tab 130 on the link arm 127 rather than the bolt that locks the locking device 100.

Figure 2:
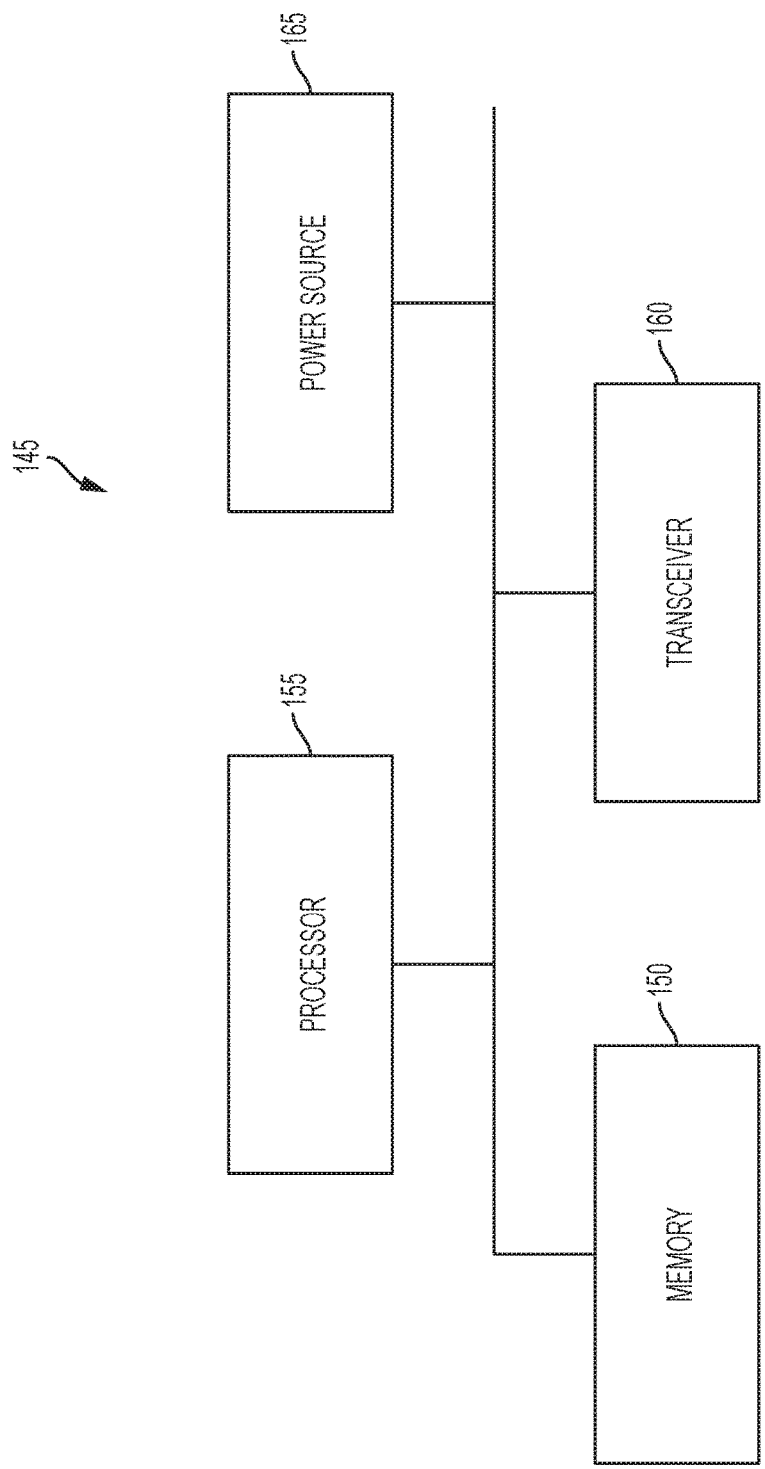
FIG. 2 is a schematic diagram of a control unit according to at least one embodiment of the present invention.

Referring to FIG. 2, a schematic diagram of a communications interface 145 in accordance with an embodiment of the present invention is shown. As discussed above, the communications interface 145 is responsible for transmitting or receiving signals relating to a locked state of the locking device 100. The communications interface 145 communicates this locked state to the user in various manners.

In some embodiments, the communications interface 145 includes a memory 150 for storing data and/or computer programs, a processor 155 for controlling operations of the communications interface 145, and a transceiver 160 for transmitting and receiving data relating to the locking device 100 to external sources, such as a personal computer. The control 145 can also have a power source 165, for example a battery, for powering operations of the control 145 and the locking device 100 in general. The above components of the communications interface 145 can be coupled together, directly or indirectly, by any known means.

In an embodiment, the memory 150 can store data and/or computer programs for use with the locking device 100. For example, the memory 150 can store a program that logs when a user locked or unlocked the locking device 100, and when a user logged in to software that controls the locked state of the locking device 100. The memory 150 can also store an operating system for the communications interface 145 or any other software or data that may be necessary for the locking device 100 to function. Without limitation, the memory 150 can include any non-transitory computer-readable recording medium, such as a hard drive, DVD, CD, flash drive, volatile or non-volatile memory, RAM, or any other type of data storage.

The processor 155 facilitates communication between the various components of the locking device 100 and controls operation of the electrical components of the locking device 100. The processor 155 can be any type of processor or processors, for example, a desktop or mobile processor, embedded processor, a microprocessor, a single-core or a multi-core processor.

The transceiver 160 can be any device capable of transmitting data from the locking device 100 or capable of receiving data within the locking device 100 from an external data source. By way of example, the transceiver 160 can be any type of radio transmission antenna, cellular antenna, hardwired transceiver, or any other type of wired or wireless transceiver capable of communicating with an external device. In an embodiment, the transceiver 160 is a USB port capable of connection with a USB cable or USB flash drive, which is connected or connectable to a personal computer or other external device.

The power supply 165 can be any source of electrical or mechanical power that can power the communications interface 145. In an embodiment, the power supply 165 is a battery. However, the power supply 165 can be any component that provides power, including a battery, fuel cell, engine, solar power system, wind power system, hydroelectric power system, a power cord for attachment to an electrical socket, or any other means of providing power.

Figure 3:
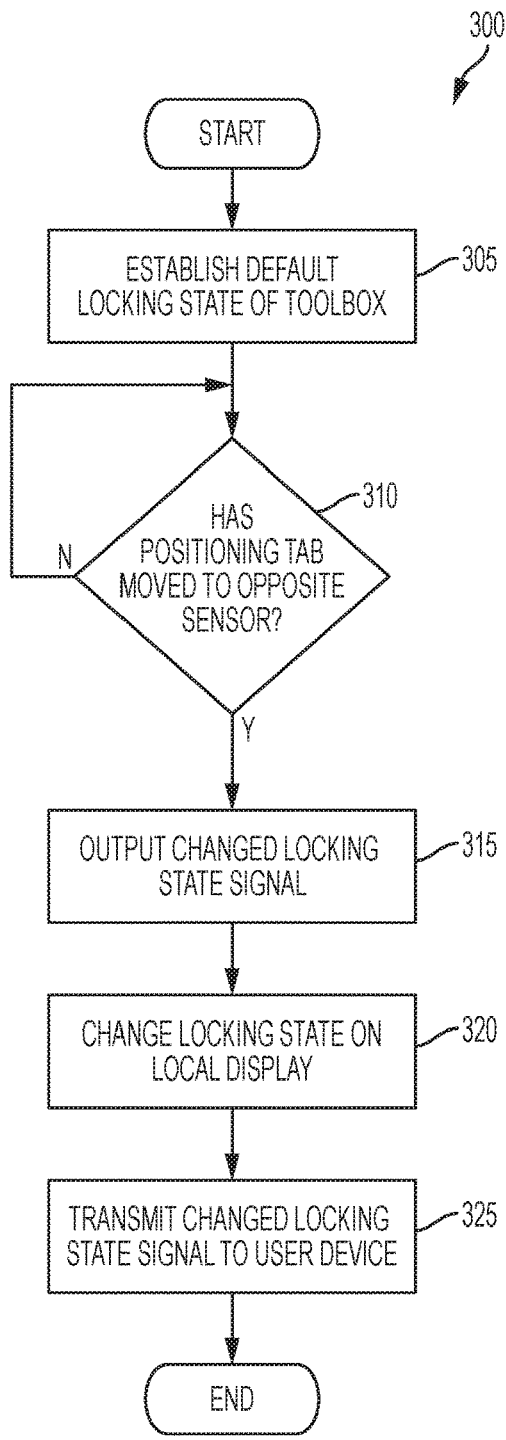
FIG. 3 is a flowchart illustrating a process according to at least one embodiment of the present invention.

Referring to FIG. 3, a flowchart illustrating a process according to at least some embodiments of the present invention is shown. As shown, the process 300 begins and proceeds to step 305, where the default locking state of the locking device 100 is determined. For example, the factory may set the locking device 100 to the locked state before releasing the product for sale. More often, the factory will set the locking device 100 to the unlocked state before releasing the product. Regardless, the process 300 requires a "starting point" upon which future changes to the locking state will be measured to determine whether the locking device 100 is in the locked or unlocked state at that time. It is to be appreciated that the default locking state of the locking device 100 can be determined by the relative location of the positioning tab 130 to one of the first 135 or second 140 sensors.

Once the default locking state is determined, the process proceeds to step 310 where a changed locking state is monitored. If the locking state does not change, the process remains at step 310 and the default locking state remains displayed on a local display (if any exists), and remains the displayed locking state at a user device (again, if any exists). Once the locking state changes, based on the movement of the positioning tab 130 from the first sensor 135 to the second sensor 140, or vice versa, the process proceeds to step 315.

In step 315, the changed locking state signal is output from the communications interface 145. For example, the changed locking state signal can be output to a processor or to another component within the locking device 100 so that the appropriate locking state can be displayed to the user. In step 320, the locking state can be displayed on a local display, should any exist. In step 325, the changed locking state signal can be transmitted to a user device for processing, if this remote feature is active on the locking device 100. Following steps 320 and/or 325, the process 300 ends.

It will be appreciated that the present invention can be used with any enclosure that incorporates a lock. As used herein, the term "enclosure" is not intended to be limited to a toolbox, roll cabinet, or any other enclosure, but rather broadly encompasses any enclosure or partial enclosure capable of implementing a lock.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A locking device comprising:
   a locking mechanism selectively positionable in locked and unlocked states;
   a plate coupled to the lock mechanism and rotatable between a first position corresponding to the locked state and a second position corresponding to the unlocked state;
   a link arm coupled to at least one of the lock mechanism and the plate, the link arm rotatable with the plate between the first and second positions;
   a positioning tab located on the link arm;
   first and second sensors spaced apart from each other and adapted to interact with the positioning tab to cause the generation of a status signal; and
   a communications interface adapted to transmit signals,
   wherein when the positioning tab is located proximate the first sensor, a first locked state signal is transmitted by the communications interface as the status signal, and wherein when the positioning tab is located proximate the second sensor, a second locked state signal is transmitted by the communications interface as the status signal.

2. The locking device of claim 1, wherein the positioning tab is composed of a metallic material and the first and second sensors are inductive sensors.

3. The locking device of claim 1, wherein the communications interface is adapted to transmit the first and second locked state signals to either one or both of a local display and an external user device.

4. The locking device of claim 1, further comprising an arm coupled to the plate, and an actuator coupled to the arm, where the actuator moves linearly or quasi-linearly to cause rotation of the plate.

5. The locking device of claim 1, wherein the positioning tab is located at an end of the link arm.

6. A position locater for a locking device comprising:
   a plate;
   a link arm rotatable with the plate between first and second positions;
   a first sensor located in a first location;
   a second sensor spaced from the first sensor and located in a second location; and
   a positioning tab extending from an end of the link arm and adapted to interact with the first and second sensors to generate a status signal;
   a communications interface adapted to transmit signals,
   wherein when the positioning tab is located proximate the first sensor, a first locked state signal is transmitted by the communications interface as the status signal, and wherein when the positioning tab is located proximate the second sensor, a second locked state signal is transmitted by the communications interface as the status signal.

7. The position locater of claim 6, wherein the positioning tab is composed of a metallic material and the first and second sensors are inductive sensors.

8. The position locater of claim 6, wherein the communications interface is adapted to transmit the first and second locked state signals to either one or both of a local display and an external user device.

9. The position locater of claim 6, further comprising an arm coupled to the plate, and an actuator coupled to the arm, where the actuator moves linearly or quasi-linearly to cause rotation of the plate.

10. The position locater of claim 6, wherein the positioning tab is located at an end of the link arm.

* * * * *